US010659594B2

(12) United States Patent
Hajj et al.

(10) Patent No.: US 10,659,594 B2
(45) Date of Patent: May 19, 2020

(54) CONTEXT AWARE MOBILE PERSONALIZATION SYSTEM AND METHODS OF USE

(71) Applicant: AMERICAN UNIVERSITY OF BEIRUT, Beirut (LB)

(72) Inventors: Hazem Hajj, Beirut (LB); Wassim El Hajj, Beirut (LB); Saeid Eid, Bchamoun (LB); Sani Kiwan, Kafarmatta (LB); Joseph Majdalani, Broummana (LB); Mohammed Sulaiman Bensaleh, Riyadh (SA); Abdulfattah Mohammad Obeid, Riyadh (SA); Syed Manzoor Qasim, Mumbai (IN)

(73) Assignee: American University of Beirut, Beirut (LB)

( * ) Notice: Subject to any disclaimer, the term of this patent is extended or adjusted under 35 U.S.C. 154(b) by 696 days.

(21) Appl. No.: 15/002,116

(22) Filed: Jan. 20, 2016

(65) Prior Publication Data

US 2016/0239194 A1   Aug. 18, 2016

Related U.S. Application Data

(60) Provisional application No. 62/115,399, filed on Feb. 12, 2015.

(51) Int. Cl.
*G06F 3/048* (2013.01)
*H04M 1/725* (2006.01)

(52) U.S. Cl.
CPC .... *H04M 1/72569* (2013.01); *H04M 1/72519* (2013.01)

(58) Field of Classification Search
None
See application file for complete search history.

(56) References Cited

U.S. PATENT DOCUMENTS

| | | | |
|---|---|---|---|
| 7,716,651 B2 | 5/2010 | Cukierman et al. | 717/130 |
| 8,254,957 B2 | 8/2012 | Ferren et al. | 455/456.6 |
| 8,423,508 B2 | 4/2013 | Price et al. | 707/621 |
| 8,429,103 B1 | 4/2013 | Aradhye et al. | 706/12 |
| 8,587,402 B2 | 11/2013 | O'Shaughnessy et al. | 340/5.1 |
| 8,614,431 B2 | 12/2013 | Huppi et al. | 250/559 |
| 8,751,743 B2 | 6/2014 | Burge, III | 711/118 |
| 2003/0182394 A1 | 9/2003 | Ryngler et al. | 709/217 |
| 2010/0317371 A1 | 12/2010 | Westerinen et al. | 455/456.6 |
| 2012/0059780 A1 | 3/2012 | Kononen et al. | 706/14 |
| 2012/0149352 A1 | 6/2012 | Backholm et al. | 455/418 |
| 2012/0271913 A1 | 10/2012 | Tallgren et al. | 709/217 |
| 2012/0317194 A1 | 12/2012 | Tian | 709/204 |
| 2013/0254831 A1 | 9/2013 | Roach et al. | 726/1 |

(Continued)

FOREIGN PATENT DOCUMENTS

| | | | | |
|---|---|---|---|---|
| KR | 2014/007225 | 6/2014 | | H04W 12/06 |
| WO | WO 2011/058224 | 5/2011 | | H04W 4/00 |

(Continued)

*Primary Examiner* — Thanh T Vu
(74) *Attorney, Agent, or Firm* — J. Peter Paredes; David G. Rosenbaum; Rosenbaum IP, P.C.

(57) ABSTRACT

A context aware mobile personalization system is disclosed for a software development environment with plug-in capabilities for providing personalized phone capabilities based on the automated detection of user context.

21 Claims, 3 Drawing Sheets

(56) References Cited

U.S. PATENT DOCUMENTS

| | | | |
|---|---|---|---|
| 2014/0108307 A1 | 4/2014 | Raghunathan et al. | 706/12 |
| 2014/0204815 A1 | 7/2014 | Ismail et al. | 370/311 |
| 2014/0281470 A1* | 9/2014 | Detter | G06F 9/44 713/100 |
| 2015/0378520 A1* | 12/2015 | Chandrasekaran | G06F 3/0482 715/716 |
| 2016/0179087 A1* | 6/2016 | Lee | G01C 21/3664 700/9 |

FOREIGN PATENT DOCUMENTS

| | | | | |
|---|---|---|---|---|
| WO | WO 2013/130865 | 9/2013 | | H04W 48/18 |
| WO | WO 2013/162538 | 10/2013 | | H04W 48/16 |

\* cited by examiner

CONTEXT AWARE MOBILE PERSONALIZATION SYSTEM AND METHODS OF USE

CROSS-REFERENCE TO RELATED APPLICATIONS

The present application claims priority to U.S. Provisional Application Ser. No. 62/115,399, filed Feb. 12, 2015, herein incorporated by reference in its entirety.

BACKGROUND

The invention generally relates to mobile devices and systems, and more particularly to context aware mobile device personalization.

Mobile devices and other portable computing devices may interact with different wireless communication systems and other devices depending upon a user's environment. At present, many different wireless communication systems are in use, including long range cellular systems, and various short range technologies such as Bluetooth and Wi-Fi.

Examples of current cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

Mobile devices may also communicate with data transmitted over shorter distances with other fixed and portable devices via a Bluetooth wireless communication system. Bluetooth systems use short wavelength radio transmissions, and also utilize a frequency-hopping spread spectrum, in which data is exchanged on a number of different bands. In Wi-Fi networks are also used to wirelessly connect electronic devices, including mobile and other portable computing devices. Wi-Fi is based on the IEEE 802.11 set of standards, and may require configuration to set up shared resources, transmit files, and to set up audio links (e.g., headsets and hands-free devices). Wi-Fi uses the same radio frequencies as Bluetooth, but with higher power, resulting in a faster connection and better range from a base station.

Technological advances have introduced several popular and innovative capabilities, features, and applications in the world of mobile phones. Today's smart phones have sensor capabilities that enable the phone to recognize user context and provide personal assistance.

While context aware sensing has captured attention with many publications in the field, the key differences proposed in this IDF are the targeted plug-in platforms for developers, and the provided new capabilities for managing communication mechanism (e.g. Wi-FI or 3G/4G) based on context, and hands-free blue tooth control while driving. It is worth noting that managing phone battery consumption has received its own special attention. But existing solutions do not take user context into account.

The present invention solves these problems as well as others.

SUMMARY OF THE INVENTION

Provided herein are systems and methods for context aware mobile personalization. A method of optimizing functionality of a mobile device, comprises: collecting data from at least one raw data source via the mobile device; processing the collected data; retrieving stored settings for one or more contextual environments; analyzing the collected data based upon the retrieved stored settings to determine one or more actions to be taken based on the contextual environment determine; and communicating with a service controller of the mobile device to manipulate one or more utilities of the mobile device.

A non-transitory computer-readable storage medium containing instructions stored thereon, which, when executed by at least one processor causes the at least one processor to perform operations on context awareness, the instructions comprising: instructions to automatically manage usage of WiFi versus cellular based on automatic detection of user context; instructions for phone Bluetooth control based on automatic detection of user driving; instructions for a user interface to enable user customizing of personalization rules; and instructions to store information associated with the personalization rules.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Figure 1:
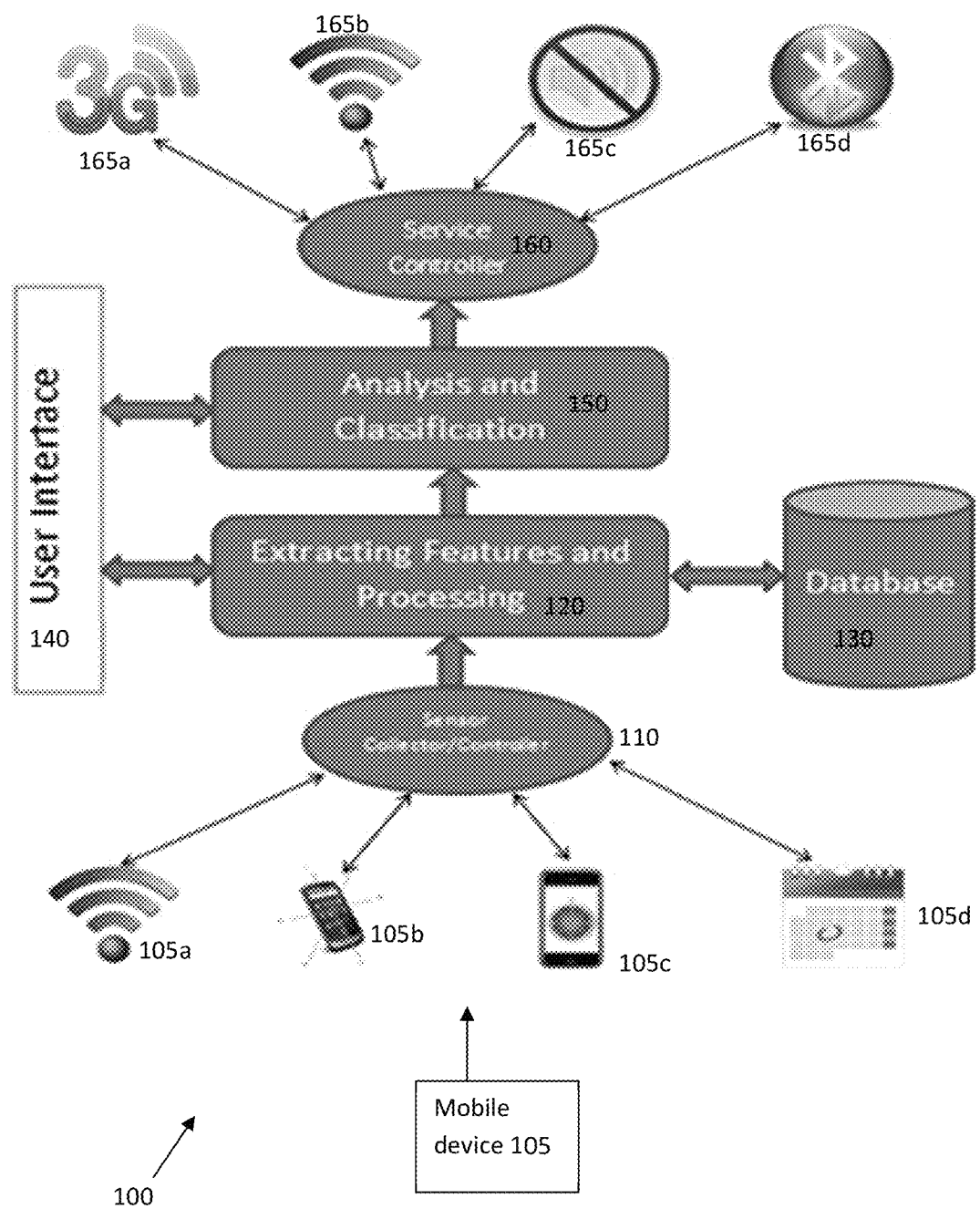
FIG. 1 is a block diagram generally outlining the architecture according to one embodiment.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein. The words proximal and distal are applied herein to denote specific ends of components of the instrument described herein. A proximal end refers to the end of an instrument nearer to an operator of the instrument when the instrument is being used. A distal end refers to the end of a component further from the operator and extending towards the surgical area of a patient and/or the implant.

The use of the terms "a" and "an" and "the" and similar referents in the context of describing the invention are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Examples of current cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies, as well as WiMAX. In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, Wireless MAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Mobile devices may also communicate with data transmitted over shorter distances with other fixed and portable devices via a Bluetooth wireless communication system. Bluetooth systems use short wavelength radio transmissions, and also utilize a frequency-hopping spread spectrum, in which data is exchanged on a number of different bands.

Wi-Fi networks are also used to wirelessly connect electronic devices, including mobile and other portable computing devices. Wi-Fi is based on the IEEE 802.11 set of standards, and may require configuration to set up shared resources, transmit files, and to set up audio links (e.g., headsets and hands-free devices). Wi-Fi uses the same radio frequencies as Bluetooth, but with higher power, resulting in a faster connection and better range from a base station.

Further, many embodiments are described in terms of sequences of actions to be performed by, for example, elements of a computing device. It will be recognized that various actions described herein may be performed by specific circuits (e.g., application specific integrated circuits (ASICs)), by program instructions being executed by one or more processors, or by a combination of both. Additionally, these sequence of actions described herein may be considered to be embodied entirely within any form of computer readable storage medium having stored thereon a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The Context Aware Mobile Personalization System provides a platform for developers to add on personalized capabilities based on user context. In addition the provided applications (communication management, and hands-free control) relieve the user from having to remember to manually control phone usage.

The new personalized capabilities allow the user to remain connected while saving battery energy. In contrast existing applications for battery management turn off all possible connections once the phone screen is turned off, thus, disallowing any applications that require internet connection.

In one aspect, immediate benefit is provided to a user with the automated reduction of power consumption in smartphones. Alternatively, any mobile system and/or mobile device may be used, and/or any combination of devices/systems that is able to establish a connection, including wired, wireless, cellular connections with another device, a server and/or other systems. Mobile devices will typically include a display and/or other output functionalities to present information and data exchanged between among the devices and/or the host server and/or application server/content provider.

For example, the mobile devices can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Palm device, a handheld tablet (e.g. an iPad or any other tablet), a hand held console, a hand held gaming device or console, any Super-Phone such as the iPhone, and/or any other portable, mobile, hand held devices, etc. In one embodiment, the mobile devices, host server, and app server are coupled via a network and/or a network. In some embodiments, the mobile devices and host server 100 may be directly connected to one another.

In some embodiments, various additional features can be added based on context recognition, such as: health care applications (fall detection, patients' observation and medical attention); social networking and sharing (sharing daily activities over the social media); and/or the like.

Generally speaking, the Context Aware Mobile Personalization System provides a platform for developers to add on personalized capabilities based on user context. In addition the provided applications (communication management and hands-free control) relieve the user from having to remember to manually control phone usage.

The new personalized capabilities allow the user to remain connected while saving battery energy. In contrast existing applications for battery management turn off all possible connections once the phone screen is turned off, thus, disallowing any applications that require internet connection.

In one aspect, the Context Aware Mobile Personalization System provides a software development environment with plug-in capabilities for providing personalized phone capabilities based on the automated detection of user context.

In one aspect, the Context Aware Mobile Personalization System provides software to automatically manage usage of Wi-Fi versus cellular based on automatic detection of user context.

In one aspect, the Context Aware Mobile Personalization System provides software for phone Bluetooth control based on automatic detection of a user context of the user driving.

In one aspect, the Context Aware Mobile Personalization System provides a design of user interface to enable user customizing of personalization rules.

The Context Aware Mobile Personalization System can be implemented on all mobile phones and can provide users and developers a platform for expanding phone features in a way to meet users' personal desires.

In one aspect, immediate benefit is provided to a user with the automated reduction of power consumption in smartphones.

In one embodiment, the application collects raw data (110) from various sensors (105*a-d*, etc.) for specific intervals of time. In some embodiments, the time intervals may be set by the user via the user interface. In some embodiments, the raw data is collected from physical sensors coupled to the mobile device 105 (e.g., GPS 105*c*, accelerometer 105*b*, detection of available WiFi or cellular networks 105*a*, etc.). In some embodiments, the raw data is collected from information stored on or accessible by the mobile device 105 (e.g., scheduled events, recent calendar, etc.). In some embodiments, the raw data may be manually input or modified by the user, such as via the user interface.

In one exemplary embodiment, the process may gather data to determine that a user is at a gym. Accelerometer 105*b* may not determine any movement of the mobile device 105, but one or more of GPS 105*c* or calendar events 105*d* or the like may provide data that the user is at the gym (e.g., GPS at gym, or user has gym calendar entry at present time). In some embodiments, the process may automatically cycle between available sensor or other raw data sources to optimize the user's outcome of the process.

Once raw data is collected at 110, the required statistical features are extracted and calculated (120). At step 120, the application may in some embodiments communicate with a database 130, which may be on the mobile device 105 or otherwise accessible by the mobile device 105. In some embodiments, the application may retrieve stored preferences input by the user via the user interface 140, and utilize these retrieved preferences during processing (at 120) and/or analysis and classification (150).

Once extraction and calculation 140 are complete, the calculated values are fed to the classifier module (150). Within the classifier module 150, the extracted data, preset configurations, user settings/preferences, and the like are processed and evaluated to determine the relevant context at the time of analysis. Based upon this determined context, the appropriate actions are taken. In some embodiments, the classifier module 150 may retrieve rules from the user interface 140, from database 130 on the mobile device 105 or remotely accessible by the mobile device 105, and/or the like.

For example, to personalize phone battery usage based on context, in one embodiment the following rules that are context dependent could be implemented:

IF the user is driving or running THEN turn OFF both WI-FI AND Mobile Data

IF the user is idle and WI-FI is available THEN Turn OFF Mobile Data and Keep WI-FI IF the user is idle and WI-FI is NOT available THEN Turn OFF WI-FI and KEEP Mobile data In another embodiment, to personalize automatic control for Bluetooth while driving, the following rules that are context dependent could be implemented:

IF the user is driving THEN turn on Bluetooth only to allow the phone to automatically connect to the car audio system to send and receive calls hands-free while driving.

IF the user switches to context other than driving THEN turn off Bluetooth.

In some embodiments, multiple wireless connections may be managed simultaneously by the application (e.g., both WiFi/mobile and Bluetooth).

In some embodiments, the classifier module 150 may select one or more analyzed data elements to control the contextual action(s) selected. For example, a calendar entry 105*d* may override an accelerometer 105*b* reading, but the calendar entry 105*d* may be overridden by a GPS reading 105*c* that indicates the user is not present at the gym as scheduled.

In some embodiments, the user may input their own custom rules for classification. For example, the user may input a rule that a specific data source may be prioritized during a pre-selected timeframe (e.g., specific hours of the day, days of the week, etc.).

Once analysis and classification 150 is complete, the process interacts with a service controller 160 to control the utilities of the mobile device 105. In one embodiment, the service controller 160 may turn mobile data 165*a* on or off. In one embodiment, the service controller 160 may turn Wi-Fi 165*b* on or off. In one embodiment, the service controller 160 may turn a ringer volume 165*c* on or off. In one embodiment, the service controller 160 may turn Bluetooth 165*d* on or off. In other embodiments, service controller 160 may control other device utilities dependent upon the context awareness according to one embodiment. The service controller 160 may be operably coupled to a processor or switching device.

In some embodiments, the analysis 150 may further interact with the service controller 160 to create a log of gathered raw data, analyzed data, and/or the like. For example, the service controller 160 may generate a log sheet of a user's daily routine. In one embodiment, the service controller 160 may communicate with one or more additional applications accessible by the mobile device 105 (e.g., another "App", email client, text files, etc.). In one embodiment, the log of gathered raw data may be stored on a computer-readable (storage) medium or cache. A cache is a component that stores data so future requests for that data can be served faster; the data stored in a cache might be the result of an earlier computation, or the duplicate of data stored elsewhere. A cache hit occurs when the requested data can be found in a cache, while a cache miss occurs when it cannot. Cache hits are served by reading data from the cache, which is faster than recomputing a result or reading from a slower data store; thus, the more requests can be served from the cache, the faster the system performs.

In one embodiment, the Context Aware Mobile Personalization System may be configured to utilize an initial "learning period" when first operated by the user. For example, the process may monitor the user's actions/contexts for one or more weeks (or one or more days, etc.), and automatically optimize the default contextual settings based upon this monitoring. After the monitoring period, the process may adjust the default contextual settings to align with the user's typical schedule and/or contextual environments.

In some embodiments, various additional features can be added based on context recognition, such as but not limited to: health care applications (fall detection, patients' observation and medical attention); social networking and sharing (sharing daily activities over the social media); and/or the like.

In some embodiments, the process may further comprise one or more of: Saving daily routine for the users in order to be used later by different applications and research; Helpful reminders and life organizers based on context; Phone personalization based on user's context; and/or the like.

In one embodiment, the Context Aware Mobile Personalization System associates raw data 110 collected from sensors or other data sources available to the mobile device 105 with one or more specific contexts. In some embodiments, information based on said association may be delivered to the user via the mobile device 105, in addition to the parallel functionality operating to contextually optimize the mobile device 105.

In general, the process operates such that actions are taken according to the context detected and the user's configuration. In one embodiment, the Context Aware Mobile Personalization System comprises a framework for context aware application development. In one embodiment, the Context Aware Mobile Personalization System is a framework for context awareness with plug-in capabilities. In one embodiment, additional or alternative features that need context awareness can be implemented and added to the framework.

In one embodiment, the Context Aware Mobile Personalization System is configured to by default function to optimize battery saving feature through Wi-Fi/3G synchronization based on context and/or operate an automatic driving control (such as for Bluetooth).

Figure 2:
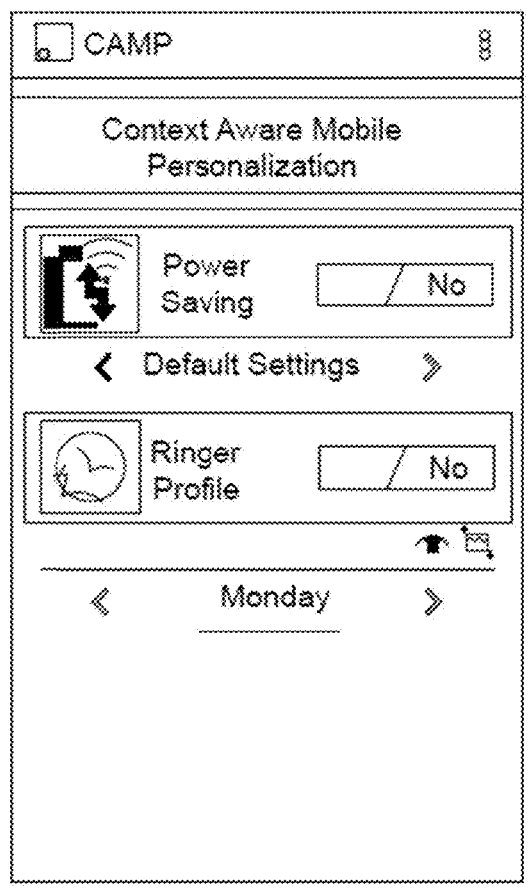
FIG. 2 is a screenshot of the user interface for customization, according to one embodiment.
Figure 3:
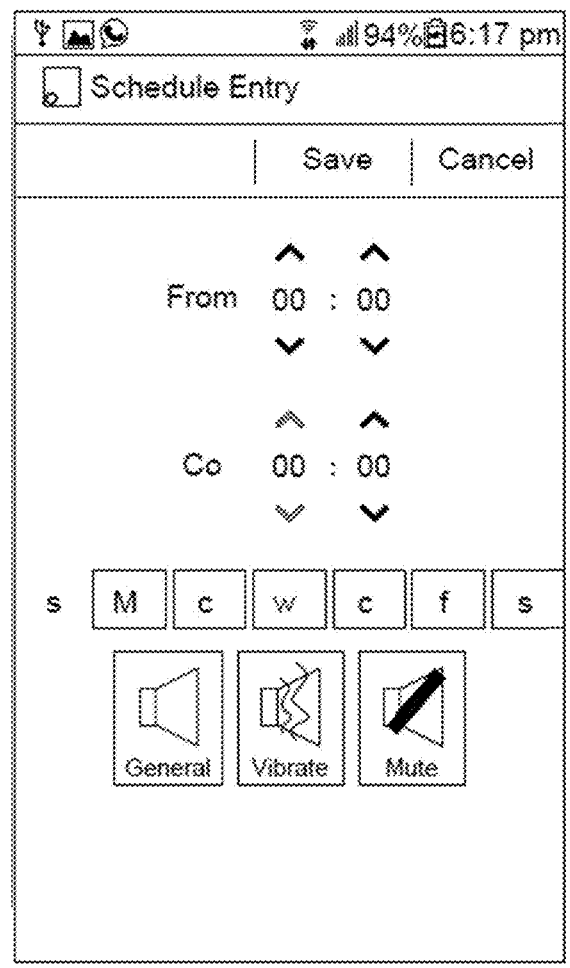
FIG. 3 is a screenshot of the user interface where the user may customize the process to operate during specified hours of a desired day or days, according to one embodiment.
Figure 4:
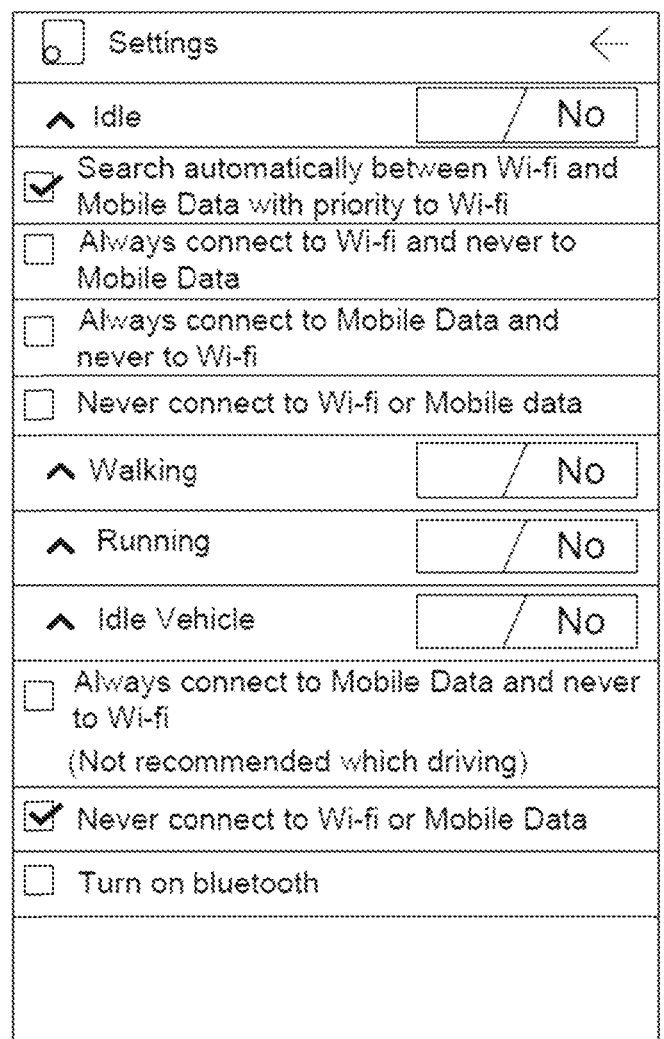
FIG. 4 is a screenshot illustrating an exemplary screenshot of the user interface for customizing the operational/contextual settings of the process, according to one embodiment.

FIGS. 2-4 illustrate exemplary screen shots of the user interface 140. As shown in FIG. 2, the process may be turned on or off by the user, or allowed to function under default settings. In some embodiments, the user may customize the process to operate on a desired day or days only (e.g., only operate Monday to Friday). In a further embodiment, as shown in FIG. 3, the user may customize the process to operate during specified hours of a desired day or days.

FIG. 4 illustrates an exemplary screenshot of the user interface for customizing the operational/contextual settings of the process. For example, contextual states/environments that may be determined by the process include, but are not limited to: Idle state; walking state; running state; driving state; and/or the like. In some embodiments, the user may toggle specific contextual states on or off as desired. Within each contextual state, the user may customize the operational settings of the process. For example, in the idle state (e.g., analysis 150 determines that user is generally stationary), the user may choose among settings including but not limited to: 1) Switch automatically between Wi-Fi and Mobile Data with priority to Wi-Fi; 2) Always connect to Wi-Fi and never to Mobile Data; 3) Always connect to Mobile Data and never to Wi-Fi; 4) Never connect to Wi-Fi or mobile data; and/or the like. Similar settings options may be available in other contextual states such as "walking" or "running."

In some embodiments, the user may manually input a contextual state so as to override the analysis 150. For example, if a user is running on a treadmill, the user may override the analysis 150 which may otherwise determine the user is idle.

In one embodiment, the Context Aware Mobile Personalization System comprises a platform framework for developing and/or implementing context aware applications depending on a user's inputs and/or needs.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method of optimizing functionality of a mobile device and providing a platform for expanding mobile device features through an automated process, comprising:
    a) Collecting raw data from at least one sensor for a specific interval of time;
    b) Extracting statistical features from the collected raw data and calculating the statistical features;
    c) Communicating with a database accessible by the mobile device and retrieving stored preferences from the database, and automatically cycling between step a) and raw data collected from the stored preferences;
    d) Feeding the calculated statistical features to a classifier module and utilizing the retrieved stored preferences with the classifier module;
    e) Processing the calculated statistical features and the retrieved stored preferences to determine a relevant context at the time of analysis;
    f) Classifying the relevant context at the time of analysis;
    g) Relieving the user to manual control mobile device usage and the utilities of the mobile device; and
    h) interacting with a service controller on the mobile device to automatically control the mobile device utilities dependent upon the relevant context and extending the battery life of the mobile device.

2. The method of claim 1, wherein the stored preferences is selected from the group consisting of scheduled events, calendar entries, manually inputted data, and modified data by the user.

3. The method of claim 2, further comprising adding additional features based on the relevant context in health care applications selected from the group consisting of fall detection, patients' observation and medical attention.

4. The method of claim 3, wherein the at least one sensor is selected from the group of GPS, accelerometer, and detection of available WiFi or cellular networks.

5. The method of claim 1, wherein the time intervals are set by the user via the user interface or recommended by the automated process.

6. The method of claim 5, wherein the stored preferences are selected from the group of preset configurations and user settings/preferences.

7. The method of claim 6, further comprising retrieving rules from a user interface and the database accessible by the mobile device.

8. The method of claim 7, further comprising personalizing phone battery usage based on the relevant context.

9. The method of claim 8, further comprising personalizing automatic control for Bluetooth while driving based on the relevant context.

10. The method of claim 6, wherein step g) further comprises turning mobile data on or off by the service controller dependent upon the relevant context; turning Wi-Fi on or off by the service controller dependent upon the relevant context; turning the ringer volume on or off by the service controller dependent upon the relevant context; turning a ringer volume on or off by the service controller dependent upon the relevant context; turning Bluetooth on or off by the service controller dependent upon the relevant context.

11. The method of claim 10, wherein step e) further comprises creating a log of collected raw data and analyzed data in the service controller selected from the group consisting of: generate a log sheet of a user's daily routine, and communicating with one or more additional applications accessible by the mobile device; and storing the log of collected raw data on a computer-readable medium.

12. The method of claim 6, further comprising utilizing an initial learning period when the mobile device is first operated by the user; monitoring the user's actions/contexts for one or more weeks, and automatically optimizing the default contextual settings based upon this monitoring.

13. The method of claim 6, further comprising additional features based on the relevant context in social networking applications.

14. A method of optimizing functionality of a mobile device and providing a platform for expanding mobile device features through an automated process, comprising:
  a) Collecting raw data from at least one sensor for a specific interval of time, wherein the time intervals are set by the user via a user interface or recommended by the automated process;
  b) Extracting statistical features from the collected raw data and calculating the statistical features;
  c) Communicating with a database accessible by the mobile device and retrieving stored preferences from the database, wherein the stored preferences is selected from the group consisting of scheduled events, calendar entries, manually inputted data, and modified data by the user, retrieving rules from a user interface and the database accessible by the mobile device, and automatically cycling between step a) and raw data collected from the stored preferences;
  d) Feeding the calculated statistical features to a classifier module and utilizing the retrieved stored preferences with the classifier module;
  e) Processing the calculated statistical features and the retrieved stored preferences to determine a relevant context at the time of analysis and creating a log of collected raw data and analyzed data in the service controller selected from the group consisting of: generate a log sheet of a user's daily routine, and communicating with one or more additional applications accessible by the mobile device; and storing the log of collected raw data on a computer-readable medium;
  f) Classifying the relevant context at the time of analysis;
  g) Relieving the user to manual control mobile device usage and the utilities of the mobile device; and
  h) interacting with a service controller on the mobile device to automatically control the mobile device utilities dependent upon the relevant context and extending the battery life of the mobile device, and personalizing phone battery usage based on the relevant context.

15. The method of claim 14, wherein the at least one sensor is selected from the group of GPS, accelerometer, and detection of available WiFi or cellular networks.

16. The method of claim 15, wherein the stored preferences are selected from the group of preset configurations and user settings/preferences.

17. The method of claim 16, wherein step h) further comprises turning mobile data on or off by the service controller dependent upon the relevant context; turning Wi-Fi on or off by the service controller dependent upon the relevant context; turning the ringer volume on or off by the service controller dependent upon the relevant context; turning a ringer volume on or off by the service controller dependent upon the relevant context; turning Bluetooth on or off by the service controller dependent upon the relevant context.

18. The method of claim 17, further comprising personalizing automatic control for Bluetooth while driving based on the relevant context.

19. The method of claim 18, further comprising utilizing an initial learning period when the mobile device is first operated by the user; monitoring the user's actions/contexts for one or more weeks, and automatically optimizing the default contextual settings based upon this monitoring.

20. The method of claim 19, further comprising adding additional features based on the relevant context in health care applications selected from the group consisting of fall detection, patients' observation and medical attention.

21. The method of claim 20, further comprising additional features based on the relevant context in social networking applications.

* * * * *